United States Patent [19]
Erfan

[11] Patent Number: 5,171,597
[45] Date of Patent: Dec. 15, 1992

[54] METHOD OF PRESERVING BEVERAGES USING GLUTATHIONE AND GLUTAMINE

[76] Inventor: Onje Erfan, 2110 W. 120th Ave., Suite 101B, Denver, Colo. 80234

[21] Appl. No.: 751,940

[22] Filed: Aug. 27, 1991

[51] Int. Cl.$^5$ .......................... A23L 2/18; A23L 2/38
[52] U.S. Cl. .................................... 426/335; 426/532
[58] Field of Search ............ 426/590, 592, 532, 330.3, 426/330.4, 330.5, 335

[56] References Cited

U.S. PATENT DOCUMENTS 4,879,127  11/1989  Liu ........................................ 426/639
4,956,190  9/1990  Chawan ................................ 426/262

FOREIGN PATENT DOCUMENTS 988266  1/1983  U.S.S.R. ..

Primary Examiner—Carolyn Paden
Attorney, Agent, or Firm—Kyle W. Rost

[57] ABSTRACT

A new use for glutamine and glutathione is in a method of preserving a beverage. Preservation is achieved by mixing with the beverage an effective amount of glutathione and glutamine, sufficient to inhibit the growth of micro-organisms in the beverage. This method is especially applicable to beer, but also is useful with other alcoholic and non-alcoholic beverages. A preferred, approximate maximum concentration of the effective agents, as applied to beer, is approximately 50 mg glutathione and 200 mg glutamine per 12 ounces of beer.

13 Claims, No Drawings

METHOD OF PRESERVING BEVERAGES USING GLUTATHIONE AND GLUTAMINE

TECHNICAL FIELD

The invention generally relates to food or edible material: processes, compositions and products. More specifically, it relates to inhibiting chemical or physical change of food by contact with a change inhibiting chemical agent. The invention is especially pertinent to treating liquid material, especially beverages or beverage concentrates, including alcohol containing beverages and fruit and vegetable juice. The invention also has specific application to products per se, or processes of preparing or treating compositions involving chemical reaction by addition, combining diverse food material, or permanent additive; especially beverages or beverage concentrates, and more specifically alcohol containing beverages. The invention has further pertinence to stabilizing or preserving agents other than organophosphatide.

BACKGROUND ART

Microorganisms such as Sarcina, Sarcina Aurea, Sarcina Flave, Pediococcus, Lactobacillus, wild yeasts, Zymomonous, and others pose significant threat to the integrity of alcoholic beverages such as beer and wine, and non-alcoholic beverages such as soft drinks and fruit juices. The common techniques for preventing growth of such organisms in beverages are well known for use in connection with beverage canning and bottling operations. For example, in the beer industry a variety of measures, are employed, including ultra filtration, pasteurization, and refrigeration.

It would be desirable to prepare alcoholic and non-alcoholic beverages in a manner that permits substantial temperature variations without the need for refrigeration or pasteurization. In particular, it would be desirable to preserve unpasteurized or ultra filtered beverages, such as draft beer, without the need for refrigeration.

Further, it would be desirable to preserve beverages in such a way that no artificial substance need be present. Thus, it would be desirable to discover an additive capable of preserving beverages, which additive normally is present in human biochemical cycles. Further, such additive should be nontoxic in effective concentration, and it would be highly desirable if the additive is potentially beneficial even when consumed.

To achieve the foregoing and other objects and in accordance with the purpose of the present invention, as embodied and broadly described herein, the method of preparing beverages of this invention may comprise the following.

DISCLOSURE OF INVENTION

Against the described background, it is therefore a general object of the invention to provide an improved method of preparing beverages by which a common biochemical substance is added to the beverage in quantity sufficient to preserve the beverage against growth of microorganisms present in the beverage.

Another object is to preserve beer and other alcoholic beverages by the addition of a biochemical product that also is known to reduce the toxic effect of alcohol on the central nervous system and upon neuromuscular coordination, so that the preservative can provide a reduction in the typical harmful effects of alcohol to those who consume the beverage. Thus, the biochemical product not only preserves the beverage, but also it has a potential to make the beverage itself safer to the consumer.

A more specific object is to prepare beer and similar alcoholic beverages by the addition of glutathione, in order to preserve the beer.

Another specific object is to prepare beer with a preservative that stabilizes flavor as well as creates and preserves foam.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a method of preserving a beverage is by mixing with the beverage an effective amount of glutathione and glutamine, sufficient to inhibit the growth of micro-organisms in the beverage. This method is especially applicable to beer, but also is useful with other alcoholic and non-alcoholic beverages. A preferred concentration of the effective agents is approximately 50 mg glutathione and 200 mg glutamine per 12 ounces of beverage.

BEST MODE FOR CARRYING OUT THE INVENTION

The preparation and preservation of beer, in particular, and generally the preparation of preservation of any type of beverage is achieved by the addition of an effective amount of selected amino acid tripeptide and monopeptide. These biologically active, naturally occurring ingredients have been found to have a new use, in that they preserve beverages, especially beer, against degeneration due to growth of micro-organisms. In particular, beer and other beverages treated with an effective amount of these agents are preserved while stored at room temperature, under conditions where untreated beverages deteriorate due to age, oxidation, and growth of micro-organisms.

The effective agents include glutathione, which is composed of L-cysteine, L-glutamic acid, glycine, and monopeptide glutamine. These nontoxic peptides are present at the human cellular level, and they occur in all body fluid. They are prominent in cerebrospinal fluid and organs such as liver, spleen, kidneys, lens, erythrocytes and leukocytes, Their physical properties consist of a sweet and sour taste, white crystalline powder which is freely soluble in water. Theri combination can be produced in the laboratory, where the molecules of glutathione and glutamine can be bonded to form a compound molecule, or the various individual molecules can be mixed in proper proportion to achieve the desired biological and biochemical effects.

The effective agents can be mixed with the beverage to be treated by first solubilizing the agents. The desired quantity of the agents can be dissolved in water or in a small portion of the beverage itself, prior to mixing with the beverage. This technique is useful when a beverage already is in a bottle, can or other small container before being treated. For mixing the agents with bulk quantities of the beverage, the agents may be mixed into the beverage or its precursors in a storage tank, brewing or mixing tank, or the like, without requiring prior solubilization.

Microorganisms such as Sarcina, Sarcina Aurea, Sarcina Flave, Pediococcus, Lactobacillus, wild yeasts, Zymomonous and others have posed a significant threat to the integrity of alcoholic beverages such as beer and wine, and non-alcoholic beverages such as soft drinks and fruit juices. By introducing a formulation of the above noted sulfur amino acid tripeptide and monopeptide to beverages, the need for pasteurization and refrigeration is eliminated. This is partially due to the bioenzymatic and biochemical activities of the peptides. In addition, the ability of the peptides to tolerate higher temperature eliminates other complex processes. Beverages treated with this formulation can withstand higher temperature of 30°-40° F. above the normal recommended cool storage temperature of 36°-40° F. Storage at such higher temperature (around 70°-75° F.) does not alter taste or the integrity of the treated beverage. At the elevated temperature, microorganisms are as inactive as at the cool storage temperature or as with pasteurization for as long as two years without signs of significant oxidation.

The agents appear to be highly effective anti-oxidant substances and reducing agents, which create a stabilizing environment when combined in a proper proportion to prevent growth of the microorganisms. In addition to being an effective natural preservative, the formulation preserves natural flavor and prolongs the viability of substances other than alcoholic beverages and non-alcoholic beverages.

It may be noted that the effective agents have been reported to be beneficial to humans due to biochemical properties. Consequently, although these advantages are not a discovery unique to the invention, but are previously reported in medical literature, it may be expected that such advantages will continue to accrue when the agents are consumed as a part of preserved beverages, in the same manner such benefits might accrue by consumption of the agents, alone.

In particular, the formulation is an anti-oxidan&. and reducing agent, and thus has the capability of minimizing the toxic effect of alcohol present in beer on the central nervous system and the neuromuscular coordination of those who consume the treated beer. This property is due to metabolic activities in the body and brain. Since about 25 percent of all body metabolic activity occurs in the brain, the brain consumes about 25 percent of all metabolic energy. To maintain efficient brain function, one of the most helpful free-form amino acid supplements is glutamic acid. Its importance lies in the fact that the body needs it to rid the brain of ammonia. Ammonia is created in the body by the breakdown of worn-out protein, as a natural and continuous process of the body's metabolism. It is well known that the body employs the urea cycle to clear this ammonia, wherein ammonia is converted to urea, which the body can excrete in urine.

The first and most important stage of this pathway is the reaction of glutamic acid with ammonia, wherein the two combine to produce the harmless chemical, glutamine. Supplemental glutamic acid does not cross the blood-brain barrier easily. Glutamine, on the other hand, crosses this barrier with ease. Once in the brain, glutamine is converted to glutamic acid before combining with ammonia and converting back to glutamine. Once ammonia has been converted, the brain can use glutamine, like the sugar glucose, as a source of energy. Glutamine is known to be indispensable for the treatment of a variety of alcohol related disorders.

Glutathione is reported in medical journals to have beneficial attributes, particularly in the prevention and treatment of degenerative disease. Research studies show that glutathione is an anti-oxidant and de-activator of free radicals; anti-tumor agent; de-toxifier of heavy metals and drugs; an aid in the treatment of liver and blood disorders; due to anti-inflammatory properties, an aid in the treatment of allergies, cataracts, diabetes, hypoglycemia, and arthritis; an aid in ameliorating harmful side effects of high dose radiation, chemotherapy, and x-rays; an amino acid transporter; an aid in accelerating respiration in the brain; and an aid in the utilization of iron, cystine and cysteine.

Further, researchers have reported that glutathione is useful in protecting the liver from alcohol-induced damage. Intrahepatic glutathione is believed to afford protection against liver damage by (1) as a substrate of glutathione peroxidase, serving to reduce a large variety of hydroperoxides before they attach unsaturated lipids, and to convert already formed lipid hydroperoxides to the corresponding hydroxy compounds; and (2) as a substrate of glutathione-S-transferases, enabling the liver to detoxify many foreign compounds or their metabolites and to excrete the products preferably into the bile. Accordingly, there is reason to believe that glutathione is useful in detoxifying lipid peroxidation within the liver, a process that appears to be a basic deteriorative reaction in the multiple-cause chain of events that leads to hepatic damage.

In view of both the known and likely benefits to be derived from glutamine and glutathione, without any known toxic effect, these agents can be employed in beverages in higher than minimum concentration without concern for undesirable side effects. The limiting factors in determining acceptable concentration are taste, color, odor and scent. Consequently, experimental efforts have sought to discover acceptable quantities by organoleptic analysis.

EXAMPLE 1

This set of experiments demonstrates the effect of certain naturally formed amino acids on beer, when added in proper concentration. It demonstrates that the amino acids serve the following functions and provide the following benefits, without requiring the use of other chemicals: (a) anti-oxidant; (b) no need for pasteurization; (c) no need for refrigeration; (d) inhibits the micro-organisms that are present from growing in the beer; (e) minimizes the toxicity of alcohol in beer; (f) minimizes the toxic effect of alcohol in beer on the central nervous system and neuromuscular coordination of consumer; (g) may prevent alcoholism and hypoglycemia; (h) increases the shelf life of beer stored at normal room temperature; (i) may enhance metabolic activities in the body, especially in the liver and its effect on gout and uric acid; (j) natural preservative.

The following materials were employed:
a. Amino acids: glutathione, glutamic acid, glutamine.
b. Beer, three different brands: Coors, Anheuser Busch, Miller.
c. Types of beer: light beer, regular beer.
d. Distilled water.

The materials were employed to create various formulae of amino acids that were added to beer. More than 300 formulae of amino acids and beer were tested under varying circumstances and conditions. From such tests, one preferred formulation was selected as having the highest potential to achieve the objectives of the invention. In addition, the chosen, preferred formulation does not alter the taste of the beer or compromise the effectiveness of the formula.

The preferred formula is 50 mg glutathione and 200 mg of glutamine dissolved in 6 ml of beer or distilled water, then added to a 12 ounce bottle of beer. The dosage, taste, and overall formula were evaluated by taste experts. They found that this formulation produces no detectable taste, color, odor, or scent that may alter the integrity of beer. Accordingly, the formula represents an approximate preferred, desirable concentration as applied to beer.

The number of control and experimental samples included 1000 beer samples or specimens over a period of two years. These samples consisted of 12 ounce bottles, 32 ounce bottles, 40 ounce bottles, and bulk samples ("party balls" and kegs).

The distribution of samples included a control group of 500 bottles, consisting of 250 bottles of light beer and 250 bottles of regular beer. An experimental group also was 500 bottles, consisting of 250 bottles each, light beer and regular beer. The samples were divided into 12 groups and treated as follows: Four initial equal groups of light beer bottles were designated (1)-(4). (1) The first group, an experimental group, was treated with the formula, then placed in the refrigerator. (2) The second group, a control group without the formula, was placed in the refrigerator. (3) The third group, an experimental group, was treated with the formula, then stored at room temperature, 70°-75° F. (4) The fourth group, a control group, was stored at room temperature, 70°-75° F. Four initial equal groups of regular beer bottles were designated groups (5)-(8), and treated as follows: (5) The fifth group, an experimental group, was treated with the formula and placed in a refrigerator. (6) The sixth group, a control group, was placed in a refrigerator without treatment. (7) The seventh group, an experimental group, was treated with the formula and kept at room temperature. (8) The eighth group, a control group, was not treated and was kept at room temperature.

Groups (9)-(12) were bottled light beer whose caps were punctured to allow pressure and carbonation to escape, as well as to allow airborne microorganisms to enter the beer. This part of the experiment was to ascertain whether or not carbonation and pressure play any role in preservation of beer. In addition, it objectified the biochemical effects of the formulae on various microorganisms present in beer and on airborne organisms. (9) An experimental group of light beer, the ninth group was treated with the formula, caps then punctured, and the group was placed in a refrigerator. (10) A control group of untreated light beer bottles, this group had its caps punctured and then was placed in a refrigerator. (11) An experimental group, the bottles were treated with the formula, their caps punctured and then kept at room temperature. (12) A control group of light beer bottles, the caps were punctured and the group was kept at room temperature.

Subjective evaluation of the tests confirmed that the formula does not produce a detectable taste, color, odor, or scent that may alter the integrity of beer. Additionally, it was observed that the formula creates and maintains the beer foam.

Objective evaluation shows that the formula acts as a natural, safe preservative. The experimental groups showed a minimum to no noticeable oxidation. They were drinkable without adverse side effects. The control groups were extensively oxidized and not drinkable.

The experimental groups were clear, without residues at the bottom. The control groups shows cloudy medium with floating particles and substantial amount of sediment at the bottom.

No micro-organism growth was observed in the experimental groups. Microscopic examination revealed no microbial activities. The control groups showed extensive activities generated by Sarcina, Sarcina Aurea, Sarcina Flava, Pediococcus, Lactobacillus, wild yeasts, and Zymomonous. Visual observation indicates a complete preservation of the treated samples, while the control groups appeared to have deteriorated and become non-consumable.

In the experimental groups, the treatment confirms the viability of the formula to function as a natural preservative.

The refrigerated samples in the experimental groups seem to be the same or more effected than the experimental group kept at room temperature.

EXAMPLE 2

This set of experiments is similar to those of Example 1 and demonstrates the effect of certain amino acids on wine, when added in proper concentration. One hundred samples were employed, fifty control and fifty experimental. The experimental samples were treated with 50 mg glutathione and 200 mg glutamine added to 12 oz of wine, which is the same formula applied in Example 1.

The experimental samples showed no signs of oxidation or microbial growth. The control samples showed flatness of taste, suggesting oxidation.

EXAMPLE 3

This set of experiments shows the effect of certain amino acids on fruit juices, when added in proper concentrations. Five hundred samples were employed, two hundred fifty control and two hundred fifty experimental. The samples included a cross-section of popular juices, including apple juice, orange juice, tomato juice, cranberry juice, apricot juice, V-8 brand vegetable juice, pineapple juice, and grape juice.

Glutathione was added to the experimental samples in a concentration of 50 mg per twelve ounces of fluid. Samples were aged for twelve months.

Results are closely parallel to those in Examples 1 and 2. In the experimental samples, no substantial, oxidation was observed, no micro-organism growth was observed, and taste remained unchanged. The control samples showed oxidation and microbial growth.

EXAMPLE 4

This set of experiments shows the effect of certain amino acids on bottled water, both flavored and unflavored, when the amino acid is added in proper concentrations. One hundred bottles were employed, fifty control and fifty experimental.

Glutathione was added to the experimental samples in a concentration of 50 mg per twelve ounces of fluid. Samples were aged for twelve months.

Results are closely parallel to those in Examples 1, 2, and 3. In the experimental samples, no substantial oxidation was observed, no micro-organism growth was observed. Oxidation and micro-organism growth was evident in the control samples.

EXAMPLE 5

Organoleptic analysis was applied to samples of beer, wine, and soft drinks in order to determine a range of acceptable concentration of amino acids. For alcoholic beverages, an acceptable concentration of glutathione per 12 oz of fluid was found to be from 50 mg to 200 mg. An acceptable concentration of glutamine was found to be from 150 mg to 600 mg. In non-alcoholic beverages, the acceptable amount of glutathione can vary from 50 mg to 200 mg per 12 oz of fluid.

In conclusion, based in part upon the experimental work and in part from the inventor's underlying concepts in developing this use of amino acids, the preferred embodiment of the invention is as follows. In alcoholic beverages such as beer and wine, the combination of glutathione and glutamine is preferred. In non-alcoholic beverages such as juice and soft drinks, glutathione alone is effective. There is no maximum concentration of these amino acids for each type of beverage. The amino acids are effective and safe even at saturation level of one-to-one concentration. The higher concentration can affect taste and odor, but the preservative function continues to be effective. Hence, the reported concentrations of 50 mg glutathione and 200 mg glutamine per 12 oz of fluid in alcoholic beverages, and 50 mg glutathione per 12 oz of fluid in non-alcoholic beverages, are preferred because the beverages substantially maintain their former, untreated characteristic taste and odor.

There appears to be a tolerance of about twenty to twenty-five percent within which this preferred formula can be varied without significant change in effectiveness. Lower concentrations are effective as a preservative but appear to be decreasingly so. Higher concentrations risk affective flavor, color, and scent. The relative ratio of the two components also can be varied within the apparent tolerance, with greater variation resulting in some decrease in effectiveness.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. The method of preserving a beverage, comprising: mixing with the beverage an amount of glutathione and an amount of glutamine which is sufficient to inhibit the growth of micro-organisms in said beverage.

2. The method of claim 1, wherein the beverage is beer.

3. The method of claim 1, wherein the beverage is wine.

4. The method of claim 1, wherein the beverage is fruit juice.

5. The method of claim 1, wherein the beverage is a soft drink.

6. The method of claim 1, wherein the concentration of glutamine is within the approximate range of from 150 mg to 600 mg per 12 ounces of beverage.

7. The method of claim 1, wherein the concentration of glutathione is within the approximate range of from 50 mg to 200 mg per 12 ounces of beverage.

8. The method of claim 1, wherein prior to mixing said glutathione and glutamine with the beverage, the glutathione and glutamine are dissolved in preliminary liquid.

9. The method of claim 8, wherein said preliminary liquid is water.

10. The method of claim 8, wherein said preliminary liquid is of the beverage.

11. The method of claim 1, wherein the amount of glutathione per twelve ounces of beverage approximately 50 mg, plus or minus twenty-five percent.

12. The method of claim 1, wherein the amount of glutamine per twelve ounces of beverage approximately 200 mg, plus or minus twenty-five percent.

13. The method of preserving a beverage, comprising: mixing with the beverage an effective amount of glutathione sufficient to inhibit the growth of microorganisms in said beverage.

* * * * *